United States Patent
Hashimoto et al.

(10) Patent No.: US 7,869,668 B2
(45) Date of Patent: Jan. 11, 2011

(54) METHOD FOR GENERATING CARRIER RESIDUAL SIGNAL AND ITS DEVICE

(75) Inventors: Yoshihiro Hashimoto, Tokyo (JP); Kaoru Higuma, Tokyo (JP); Junichiro Ichikawa, Tokyo (JP); Shingo Mori, Tokyo (JP); Yozo Shoji, Tokyo (JP); Hiroyo Ogawa, Tokyo (JP)

(73) Assignees: Sumitomo Osaka Cement Co., Ltd., Tokyo (JP); National Institute of Information and Communications Technology, Tokyo (JP)

( * ) Notice: Subject to any disclaimer, the term of this patent is extended or adjusted under 35 U.S.C. 154(b) by 789 days.

(21) Appl. No.: 10/593,661

(22) PCT Filed: Mar. 22, 2004

(86) PCT No.: PCT/JP2004/003852

§ 371 (c)(1),
(2), (4) Date: Jun. 5, 2007

(87) PCT Pub. No.: WO2005/091532

PCT Pub. Date: Sep. 29, 2005

(65) Prior Publication Data

US 2007/0292142 A1    Dec. 20, 2007

(51) Int. Cl.
G02F 1/01 (2006.01)
G02F 1/035 (2006.01)
(52) U.S. Cl. ............................. 385/1; 385/3; 385/14
(58) Field of Classification Search ............ None
See application file for complete search history.

(56) References Cited

FOREIGN PATENT DOCUMENTS

| | | |
|---|---|---|
| JP | 10-010480 A | 1/1998 |
| JP | 2000-091999 | 3/2000 |
| JP | 2002-353897 | 6/2002 |
| JP | 2004-080409 | 3/2004 |

OTHER PUBLICATIONS

Noguchi, K., et al., Millimeter-Wave Ti:LiNbO3 Optical Modulators, Journal of Lightwave Technology, vol. 16, No. 4, Apr. 1998, pp. 615-619.

Higuma, K., et al., X-cut LiNbO3 Optical SSB-SC Modulator, Technical Report 2002, Advanced Materials and Opto-Electronics, Sumitomo Osaka Cement Co., Ltd., pp. 17-21.

(Continued)

*Primary Examiner*—Omar Rojas
(74) *Attorney, Agent, or Firm*—Chapman and Cutler LLP

(57) ABSTRACT

A method for generating a carrier residual signal and its device, in which a heterodyne optical signal used in a photometric field or an optical fiber radio communication field can be stably generated with a simplified structure. The device includes an optical modulating unit that includes a light source generating a light wave having a specific wavelength, and an SSB optical modulator. A light wave emitted from the light source enters into the optical modulating unit. A light wave emitted from the optical modulating unit includes a carrier component related to a zero-order Bessel function and a specific signal component related to a specific high-order Bessel function while suppressing signal components other than the specific signal component related to the specific high-order Bessel function, and a ratio of optical intensity between the carrier component and the specific signal component is set substantially to 1.

10 Claims, 9 Drawing Sheets

OTHER PUBLICATIONS

Higuma, K., et al., The Development of X-cut LiNbO3 Optical Frequency Shifter / SSB-SC Modulator, Technical Report of the Institute of Electronics, Information and Communication Engineers, vol. 101, No. 656, Feb. 15, 2002, pp. 59-64 (with English Abstract).

Murata, H., et al., Novel Guided-Wave Single-Sideband Electrooptic Modulators by Using Periodically Domain-Inverted Structure, Proceedings of the Conference on Lasers Electro-Optics, May 19-24, 2002, pp. 204-205.

Kawamura, H., et al., Linearization of External Optical Modulator by Optical Operation, Technical Report, Institute of Electronics, Information and Communication Engineers, vol. 96, Jun. 27, 1996, Tokyo, Japan, pp. 57-62. (English translation of pp. 58-59).

Kawanishi, T., et al., Generation of Millimeter-Wave Impulses by Using an Optical Frequency-ShiftKeying Modulator, Technical Report, Institute of Electronics, Information and Communication Engineers, vol. 103, Jan. 21, 2004, Tokyo, Japan, pp. 7-12. (Partial English translation of pp. 8-10).

(a)

(b)

(a)

(b)

(a)

(b)

(c)

METHOD FOR GENERATING CARRIER RESIDUAL SIGNAL AND ITS DEVICE

BACKGROUND

1. Technical Field

The present invention relates to a method for generating a carrier residual signal and its device. More particularly, the present invention relates to a method for generating a carrier residual signal and its device, which is capable of obtaining a heterodyne optical signal used in a photometric field or an optical fiber radio communication field.

2. Related Art

In an optical communication field or a photometric field, a heterodyne method has been used in which two light waves having frequencies slightly different from each other overlap each other so as to generate a 'beat', and necessary information is extracted from the 'beat'.

In recent years, as an information amount is increased by a moving picture distribution service and information contents are diversified, frequency resources of a wide band can be utilized. As a result, a wireless system has been examined in which electric waves of a millimeter wave band (30 to 300 GHz) are used. In particular, since the transmission distance is short in the millimeter wave, as disclosed in Patent Document 1, an optical fiber radio communication system has been adopted in which optical communication by using an optical fiber is used in a long distance transmission portion, and an optical communication signal is converted into a radio communication signal to be used in the vicinity of a user using radio communication or a receiver. Further, it is very difficult to generate the millimeter wave by using an electrical oscillator. However, by using a heterodyne method, an optical signal having a different frequency is inputted to an optoelectric converter (O/E converter), and an outputted electric signal is amplified, which enables the millimeter wave to be easily generated.

Patent Document 1: Japanese Unexamined Patent Application Publication No. 2002-353897

In order to generate two light waves having frequencies slightly different from each other, which are used in the heterodyne method, a Zeeman laser or a method of converting one light wave by using a frequency shifter is generally used. However, since the Zeeman laser uses a He—Ne laser, a device has a large size. When the frequency shifter is used, since a plurality of optical components are combined, a light source circuit becomes complicated, and characteristics may vary due to environment variation, such as temperature variation.

Further, even when a plurality of semiconductor lasers are combined, it is required for two light waves to be adjusted on the same optical axis, and output characteristics of the semiconductor lasers vary due to the temperature variation. As a result, it may not be possible to maintain the frequency difference between the two light waves to a predetermined value.

Meanwhile, as a method of easily obtaining light waves of different frequencies, the applicants have suggested an SSB (Single Side-Band) optical modulator.

An example of the SSB optical modulator is disclosed in below Non Patent document 1.

Non Patent Document 1: "X-cut LiNbO$_3$ Optical SSB-SC Modulator" in pages 17 to 21 in "The Sumitomo Osaka Cement•technical report (2002)", published by The institute of a new technology in Sumitomo Osaka Cement Co., Ltd. in Dec. 8, 2001.

An operation principle of an SSB optical modulator will be described.

FIG. 1 is a diagram illustrating a principle of an SSB optical modulator in which carrier components are not suppressed.

According to a structure of an optical modulator, Ti or the like is dispersed on a substrate having an electrooptic effect, such as LiNbO$_3$, so as to form a Mach-Zehnder optical waveguide shown in FIG. 1. The SSB optical modulator is not limited to the single Mach-Zehnder optical waveguide shown in FIG. 1, but as shown in FIG. 2, an optical waveguide having a nesting MZ structure in which two sub MZ (Mach-Zehnder) optical waveguides MZ$_A$ and MZ$_B$ are disposed in parallel in the arms of a main MZ optical waveguide MZ$_C$ may be used according to each purpose.

FIGS. 1 and 2 show a simplified structure of an electrode for applying a modulation signal or a direct current bias signal to branch waveguides of a Mach-Zehnder-type optical waveguide. RF$_A$ and RF$_B$ show simplified structures of traveling wave coplanar electrodes for applying a microwave modulation signal to two branch waveguides of a single Mach-Zehnder-type optical waveguide or the sub MZ optical waveguides MZ$_A$ and MZ$_B$ shown in FIG. 2. Further, DC$_A$ and DC$_B$ are simplified phase adjusting electrodes for applying a direct current bias voltage that gives a predetermined phase difference to specific branch waveguide of the single Mach-Zehnder-type optical waveguide, or the sub MZ optical waveguides MZ$_A$ and MZ$_B$, and DC$_C$ is a simplified phase adjusting electrode for applying a direct current bias voltage that gives a predetermined phase difference to the main MZ optical waveguide MZ$_C$.

In the SSB optical modulation technology, it is known that an SSB modulation signal is obtained by summing the original signal and the original signal converted by using Hilbert conversion.

In order to perform the optical SSB modulation in which the carrier components are not suppressed, a dual driven single MZ modulator shown in FIG. 1 (example where a Z cut substrate is used) may be used.

While representing incident light as exp(jωt), a single frequency RF signal $\phi \cos \Omega t$ is inputted from a RF$_A$ port, and at the same time, a signal obtained by subjecting the signal to Hilbert conversion, that is, H[$\phi \cos \Omega t$]=$\phi \sin \Omega t$ is inputted from a RF$_B$ port.

Since the condition $\sin \Omega t = \cos(\Omega t - \pi/2)$ is satisfied, two signals can be simultaneously inputted by using a phase shifter for a microwave. In this case, φ denotes a modulated degree, and ω and Ω denote frequencies of a light wave and a microwave (RF), respectively.

Further, by applying a bias from a DC$_A$ port, the phase difference π/2 is given to the light waves transmitting in the arms of the MZ optical waveguide.

Therefore, focusing on a phase term of a light wave at the multiplexed location, it can be represented by Equation 1.

$$\exp(j\omega t) * \{\exp(j\phi \cos \Omega t) + \exp(j\phi \sin \Omega t) * \exp(j\pi/2)\} = 2 * \exp(j\omega t) * \{J_0(\phi) + j * J_1(\phi) \exp(j\Omega t)\} \quad (1)$$

In this case, $J_0$ and $J_1$ denote zero-order and primary Bessel functions, and the components after the primary component are ignored.

As represented by Equation 1, the zero-order and primary components remain, but a $-1^{st}$ ($J_{-1}$) component is lost (if showing it schematically, a light wave having spectrum distribution shown at the right side of the MZ optical waveguide of FIG. 1 is emitted from the MZ optical waveguide). In addition, the frequency of the zero-order spectrum light denoted by $J_0$ is ω, similar to incident light. The frequency of the primary spectrum light denoted by $J_1$ is $\omega+\Omega$, and it may become a frequency that has shifted by the frequency of the microwave from the frequency of the incident light.

Further, in order to make the $-1^{st}$ component ($J_{-1}$) remain and make the primary component ($J_1$) removed, a bias giving the phase difference $-\pi/2$ can be applied to the $DC_A$ port. In this case, the $-1^{st}$ spectrum light has the frequency of $\omega-\Omega$.

Next, a method of suppressing a zero-order Bessel function which is the carrier component will be described.

FIG. 2 is a schematic view illustrating an optical waveguide of a single side-band with suppressed carrier (SSB-SC) optical modulator. In the case of the SSB-SC optical modulator, as shown in FIG. 2, it has a structure in which sub MZ interference systems are respectively provided to both arms of a single MZ interference system.

The signal shown in FIG. 3 is applied to the sub MZ optical waveguide. This can be considered to be the same situation as a case in which common intensity modulation is performed by bottom drive.

At this time, considering a phase term of emitted light, it can be represented by Equation 2.

$$\exp(j\omega t)*\{\exp(j\phi \sin \Omega t)+\exp(j\phi \sin \Omega t)*\exp(j\pi)\}=2*\exp(j\omega t)*\{J_{-1}(\phi)\exp(j\Omega t)+J_1(\phi)\exp(j\omega t)\} \quad (2)$$

Referring to Equation 2, it can be understood that a spectrum component of an even-number order including a carrier component is cancelled (if schematically illustrating it, a light wave having the spectrum distribution shown in a right side of the MZ optical waveguide of FIG. 3 is emitted from the MZ optical waveguide).

The modulation method (SSB optical modulation) shown in FIG. 1 and Equation 1 and the modulation method (method of suppressing carrier components at the sub MZ) shown in FIG. 3 and Equation 2 are combined, so that one of the primary spectrum ($J_1$ term) and $-1^{st}$ spectrum ($J_{-1}$ term) may be selectively generated.

As such, as shown in FIGS. 1 and 2, modulation signals and direct current bias signals that are applied to various SSB optical modulators are appropriately adjusted, so that spectrum light having any frequency component may be outputted.

An advantage of some aspects of the present invention is that it provides a method for generating a carrier residual signal and its device, in which a heterodyne optical signal used in a photometric field or an optical fiber radio communication field can be stably generated with a simplified structure.

SUMMARY

According to a first aspect of the invention, a method for generating a carrier residual signal includes: causing a light wave having a specific wavelength to enter into an optical modulating unit including an SSB optical modulator; causing to be included in a light wave emitted from the optical modulating unit a carrier component associated with a zero-order Bessel function and a specific signal component associated with a specific high-order Bessel function while suppressing signal components other than the specific signal component associated with the specific high-order Bessel function; and setting a ratio of optical intensity between the carrier component and the specific signal component substantially to 1.

According to this configuration, 'substantially 1' means that when the ratio of optical intensity between the carrier component and the specific signal component is 1, the most effective heterodyne effect is anticipated in a specific transmission system (for example, a self heterodyne transmission system), and when the present invention is applied to an actual photometer or an optical fiber radio communication system, the ratio of optical intensity between the carrier component and the specific signal component includes values other than 1 within a range that does not cause problems. Specifically, when the ratio between the carrier component and the specific signal is within a range of −10 to +12 dB, it can be practically used.

According to a second aspect of the invention, in the method for generating a carrier residual signal of the first aspect, the SSB optical modulator includes two sub-Mach-Zehnder type optical waveguides nested into branch waveguides of a main Mach-Zehnder type optical waveguide.

According to a third aspect of the invention, in the method for generating a carrier residual signal of the second aspect, an optical modulation phase or intensity in the two sub-Mach-Zehnder type optical waveguides or the main Mach-Zehnder type optical waveguide that constitute the SSB optical modulator is adjusted.

According to a fourth aspect of the invention, in the method for generating a carrier residual signal of the first to third aspects, the optical modulating unit multiplexes a portion of a light wave inputted to the SSB optical modulator or another light wave having the same wavelength as the light wave with a light wave outputted by the SSB optical modulator.

According to a fifth aspect of the invention, a device for generating a carrier residual signal includes an optical modulating unit that includes a light source generating a light wave having a specific wavelength, and an SSB modulator, wherein a light wave emitted from the light source enters into the optical modulating unit, a light wave emitted from the optical modulating unit includes a carrier component associated with a zero-order Bessel function and a specific signal component associated with a specific high-order Bessel function while suppressing signal components other than the specific signal component associated with the specific high-order Bessel function, and a ratio of optical intensity between the carrier component and the specific signal component is set substantially to 1.

According to a sixth aspect of the invention, in the device for generating a carrier residual signal of the fifth aspect, the SSB optical modulator includes two sub-Mach-Zehnder type optical waveguides nested into branch waveguides of a main Mach-Zehnder type optical waveguide.

According to a seventh aspect of the invention, in the device for generating a carrier residual signal of the sixth aspect, a film is formed on the two sub-Mach-Zehnder type optical waveguides or the main Mach-Zehnder type optical waveguide that constitute the SSB optical modulator or a portion of the film is removed.

According to a eighth aspect of the invention, in the device for generating a carrier residual signal of the sixth aspect, the two sub-Mach-Zehnder type optical waveguides or the main Mach-Zehnder type optical waveguide that constitute the SSB optical modulator includes a portion having a structure in which arrangement between two branch waveguides in each Mach-Zehnder type optical waveguide and electrodes for applying a modulation electric field or a direct current bias electric field to the branch waveguides is asymmetrical to the two branch waveguides.

According to a ninth aspect of the invention, in the device for generating a carrier residual signal of the sixth aspect, the two sub-Mach-Zehnder type optical waveguides or the main Mach-Zehnder type optical waveguide that constitute the SSB optical modulator includes electrodes for applying a modulation electric field or a direct current bias electric field to two branch waveguides in each Mach-Zehnder type optical waveguide, and adjusting electrodes for adjusting the electric field applied to the branch waveguides.

According to a tenth aspect of the invention, in the device for generating a carrier residual signal of the fifth to ninth aspects, the optical modulating unit includes a bypass optical waveguide that connects the SSB optical modulator with an input unit and an output unit of the SSB optical modulator.

According to an eleventh aspect of the invention, in the device for generating a carrier residual signal of the tenth aspect, the SSB optical modulator and the bypass optical waveguide are formed on the same substrate.

According to a twelfth aspect of the invention, in the device for generating a carrier residual signal of the tenth or eleventh aspect, an optical intensity adjusting unit, which adjusts intensity of a light wave propagating through the bypass optical waveguide, is disposed in the middle of the bypass optical waveguide.

According to a thirteenth aspect of the invention, in the device for generating a carrier residual signal of the fifth to ninth aspects, the optical modulating unit multiplexes a light wave inputted to the SSB optical modulator with a light wave of another light source having the same wavelength as the light wave in an output unit of the SSB optical modulator.

According to the first aspect of the invention, the zero-order carrier component and the high-order specific signal component can be easily generated with a simplified structure by using the SSB optical modulator. In addition, since the SSB optical modulator outputs the specific signal component corresponding to the signal frequency applied to the optical modulator, the difference of frequencies between the carrier component and the specific signal component is always constant, and it is possible to output a light wave having two stabilized different frequencies.

Further, by setting the ratio of optical intensity between the carrier component and the specific signal component substantially to 1, in the self heterodyne transmission system, a heterodyne effect is distinguished, and the present invention may be effectively used in a photoelectric field or an optical fiber radio communication field using the self heterodyne transmission system.

According to the second aspect of the invention, the SSB optical modulator includes the two sub-Mach-Zehnder type optical waveguides nested into the branch waveguides of the main Mach-Zehnder type optical waveguide. Therefore, a variety of control can be made which includes selecting any signal component from the signal components associated with the high-order Bessel function as the specific signal component, suppressing high-order signal components other than the specific signal component, and maintaining the ratio of optical intensity between the carrier component and the specific signal component substantially to 1.

According to the third aspect of the invention, the optical modulation phase or intensity in the two sub-Mach-Zehnder type optical waveguides or the main Mach-Zehnder type optical waveguide that constitute the SSB optical modulator is adjusted. Therefore, it is possible to easily perform a variety of control as described above.

According to the fourth aspect of the invention, the optical modulating unit multiplexes a portion of the light wave inputted to the SSB optical modulator or another light wave having the same wavelength as the light wave with the light wave outputted by the SSB optical modulator. Therefore, it is possible to compensate for the carrier components that tend to decrease in the SSB optical modulator. As a result, the ratio of optical intensity between the carrier component and the specific signal component can be maintained substantially to 1, with which the heterodyne effect is highest in the self heterodyne transmission system.

According to the fifth aspect of the invention, similar to the first aspect of the invention, the zero-order carrier component and the high-order specific signal component can be easily generated with a simplified structure by using the SSB optical modulator. In addition, since the difference of frequencies between the carrier component and the specific signal component is always constant by the SSB optical modulator, it is possible to output a light wave having two stabilized different frequencies.

Further, by setting the ratio of optical intensity between the carrier component and the specific signal component substantially to 1, in the self heterodyne transmission system, the heterodyne effect is distinguished, and the present invention may be effectively used in a photoelectric field or an optical fiber radio communication field using the self heterodyne transmission system.

According to the sixth aspect of the invention, similar to the second aspect of the invention, a variety of control can be made which includes selecting any signal component from the signal components associated with the high-order Bessel function as the specific signal component, suppressing high-order signal components other than the specific signal component, and maintaining the ratio of optical intensity between the carrier component and the specific signal component substantially to 1.

According to the seventh aspect of the invention, by forming a film, such as a buffer layer ($SiO_2$, $Ta_2O_5$, or the like) on the two sub-Mach-Zehnder type optical waveguides or the main Mach-Zehnder type optical waveguide that constitute the SSB optical modulator, or removing a portion of the film, a phase of a light wave propagating through each optical waveguide is adjusted. Therefore, a variety of control can be easily made which includes selecting any signal component from the signal components associated with the high-order Bessel function as the specific signal component, suppressing high-order signal components other than the specific signal component, and maintaining the ratio of optical intensity between the carrier component and the specific signal component substantially to 1.

According to the eighth aspect of the invention, the two sub-Mach-Zehnder type optical waveguides or the main Mach-Zehnder type optical waveguide that constitute the SSB optical modulator includes a portion having a structure in which arrangement between two branch waveguides in each Mach-Zehnder type optical waveguide and electrodes for applying a modulation electric field or a direct current bias electric field to the branch waveguides is asymmetrical to the two branch waveguides. Therefore, since the phase state of the light wave that propagates through each optical waveguide can be adjusted to be asymmetrical, a variety of control as described above can be easily achieved.

According to the ninth aspect of the invention, the two sub-Mach-Zehnder type optical waveguides or the main Mach-Zehnder type optical waveguide that constitute the SSB optical modulator includes electrodes for applying a modulation electric field or a direct current bias electric field to the two branch waveguides in each Mach-Zehnder type optical waveguide, and adjusting electrodes for adjusting the electric field applied to the branch waveguides. Therefore, it is possible to adjust the phase of the light wave propagating through the branch waveguide by the adjusting electrode. In addition, even when the modulation signal or the direct current bias signal applied to each Mach-Zehnder type optical waveguide are interlocked with each other, the phase can be individually adjusted by the adjusting electrode.

According to the tenth aspect of the invention, the optical modulating unit includes the bypass optical waveguide that connects the SSB optical modulator with the input unit and the output unit of the SSB optical modulator. Similar to the fourth aspect of the invention, it is possible to compensate for the carrier components that tend to decrease in the SSB optical modulator. As a result, the ratio of optical intensity between the carrier component and the specific signal component can be maintained substantially to 1, with which the heterodyne effect is highest in the self heterodyne transmission system.

According to the eleventh aspect of the invention, in addition to the tenth aspect of the invention, since the SSB optical modulator and the bypass optical waveguide are formed on the same substrate, the number of components constituting the device can be reduced, and the reduction in the manufacturing cost and compactification of the device can be achieved.

According to the twelfth aspect of the invention, by adjusting the optical intensity of the light wave propagating through the bypass optical waveguide, the ratio of the optical intensity between the carrier component and the specific signal component can be controlled to become an optimum value, such as substantially 1.

According to the thirteenth aspect of the invention, the optical modulating unit multiplexes the light wave inputted to the SSB optical modulator with the light wave of another light source having the same wavelength as the light wave in the output unit of the SSB optical modulator. Therefore, similar to the fourth aspect of the invention, it is possible to compensate for the carrier components that tend to decrease in the SSB optical modulator. As a result, the ratio of optical intensity between the carrier component and the specific signal component can be maintained substantially to 1, with which the heterodyne effect is highest in the self heterodyne transmission system.

DESCRIPTION OF EXEMPLARY EMBODIMENTS

Hereinafter, preferred embodiments of the invention will be described in detail.

Figure 4:
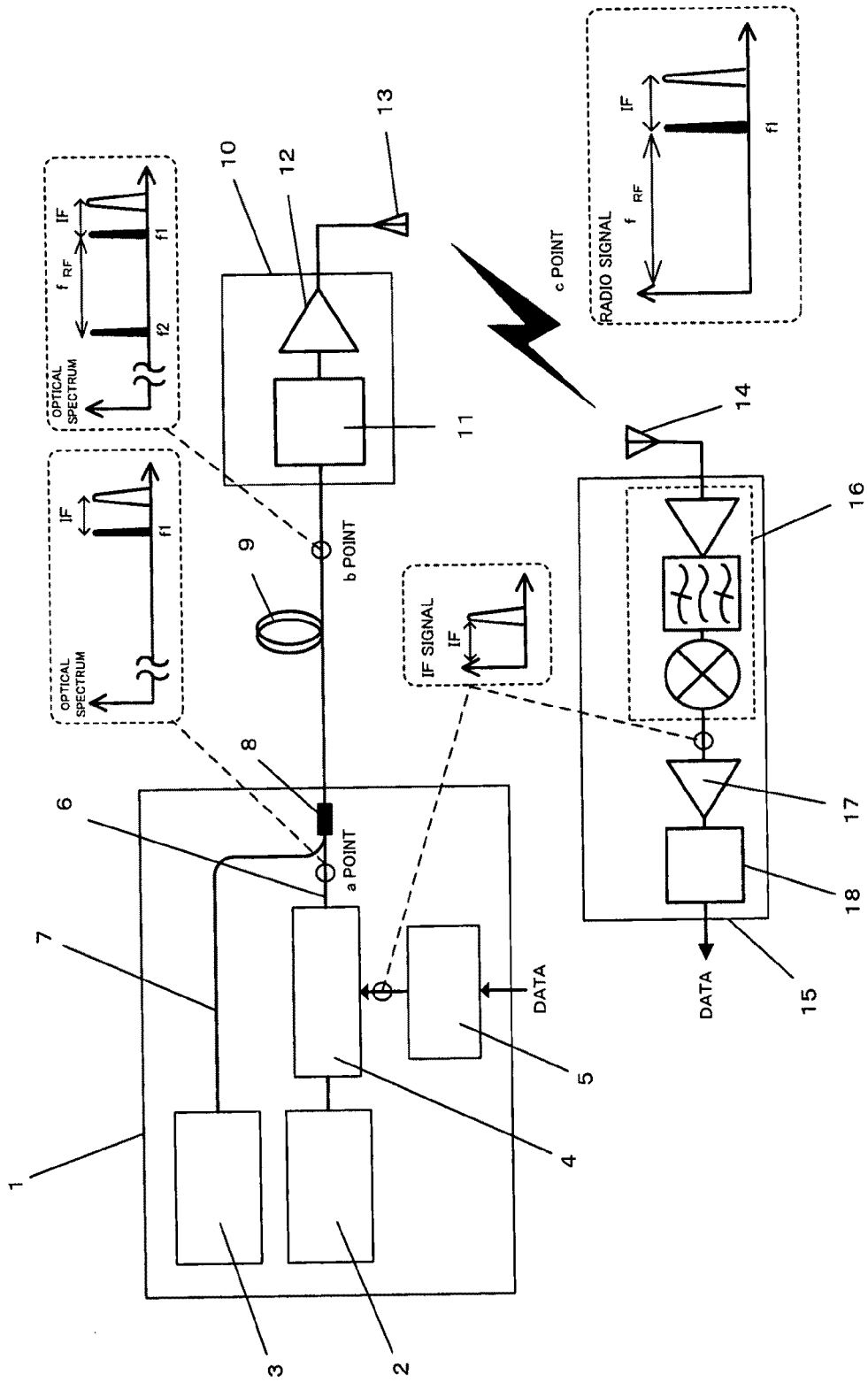
FIG. 4 is a schematic view of an optical fiber radio communication system that uses a device for generating a carrier residual signal according to an embodiment of the present invention.

FIG. 4 is a schematic view illustrating an optical fiber radio communication system to which a method for generating a carrier residual signal and its device according to an embodiment of the present invention are applied.

Figure 1:
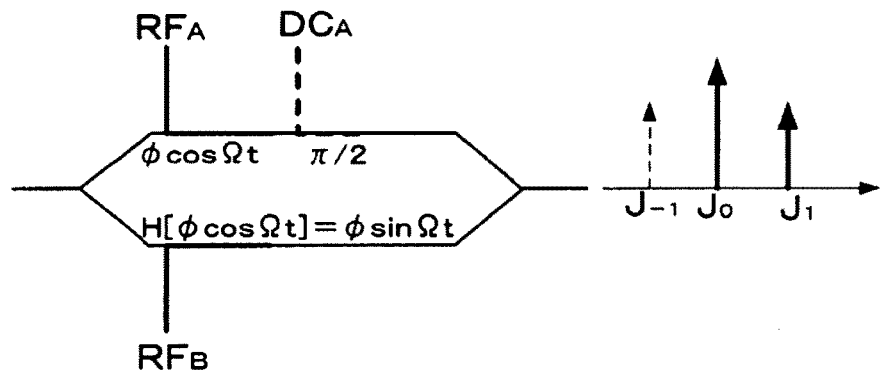
FIG. 1 is a schematic view illustrating SSB optical modulation in a single MZ optical waveguide.

The present invention is not limited to an optical fiber radio communication system shown in FIG. 1, but may be applied to a photometric field, such as an optical heterodyne interferometer.

In a downstream system of an optical fiber radio system shown in FIG. 4, a base station 1 includes two light sources 2 and 3 that operate with the optical frequency difference $f_{RF}$ by which a desired millimeter wave is obtained, an IF (Intermediary Frequency) band analog modulation signal generator 5, and an optical modulating unit 4 that has an SSB optical modulator.

The optical modulating unit will be described in detail below. In the optical modulating unit 4, A light wave (frequency f1) enters from the light source 2, and optical modulation is performed by using a microwave of frequency IF applied by the IF band analog modulation signal generator 5. As a result, a light wave that includes a carrier component (frequency f1) and a signal component (frequency f1+IF) is emitted from the optical modulating unit 4. This state corresponds to an optical spectrum at a point a. A ratio of optical intensity between the carrier component and the signal component is set substantially to 1.

The modulation frequency has an IF band in which electrical/optical conversion and signal generation are easy. If using a system having a structure in which modulation (electrical/optical conversion) is carried out by a millimeter wave signal, a modulator that has a resonance-type electrode structure or an inverse-slot-type electrode structure and high efficiency at a millimeter wave band needs to be provided. In this case, it is difficult to suppress signal components other than a specific signal component associated with a specific high-order Bessel function. Therefore, the system may be strongly affected by a dispersion penalty during fiber transmission.

Further, in a system structure in which even when an IF band is used as a modulation frequency, transmission is not made together with local emission from a transmitting station side, and fiber transmission is made, a remote antenna station having an oscillator mounted therein and requiring a complicated structure and a high cost needs to be provided.

In the optical fiber radio communication system shown in FIG. 4, an oscillator is not mounted in a remote antenna station, the modulated light is not affected by the distribution penalty over several km, and fiber transmission can be performed with minimal loss.

That is, the light wave of the frequency f2 (f1−$f_{RF}$) that is lower than the frequency f1 of the light source 1 by the optical frequency difference $f_{RF}$ corresponding to the millimeter wave frequency is emitted from the light source 3, and propagates through an optical fiber 7. The light wave that is emitted from the optical modulating unit 4 propagates through an optical fiber 6, and it is multiplexed with the light wave of the frequency f2 by an optical coupler 8. The multiplexed light wave has three spectrums. In the multiplexed optical wave, the long-distance transmission can be made by an optical fiber 9. The optical spectrum of the light wave that propagates through the optical fiber 9 constructs the distribution shown at a point b.

The remote antenna station 10 has a simplified structure that includes only an optical/electrical conversion unit 11 and an amplifier 12. In the system according to the related art, in order to improve frequency use efficiency in a radio signal, an RF filter (BPF) that is designed to remove unnecessary high-order signal components should be mounted in the remote antenna station.

However, in the optical fiber radio communication system shown in FIG. 4, since signals obtained by suppressing unnecessary high-order signal components can be generated at a base station 1 side, the remote antenna station 10 can be constructed with a low-cost simplified structure in which the RF filter is not provided.

Further, in the case of the remote antenna station 10, even when a carrier frequency is changed at the transmitting station side, it is possible to immediately manage it. Therefore, it is possible to achieve a remote antenna system in which a degree of freedom is high.

The signal in which the square detection is performed by the optical/electrical conversion unit 11 is amplified by the amplifier 12, and it is wirelessly transmitted as an image suppressing signal that has a modulation frequency IF by a carrier frequency $f_{RF}$ from a transmission antenna 13 (refers to a radio signal spectrum at a point c of FIG. 4).

Since a receiving terminal 15 does not have an oscillator, it can be provided at a low cost. The electric signal that is received from the receiving antenna 14 generates a reproducing signal square-detected through an amplifier, a band pass filter, and a square detector that construct a square detection circuit 16. In principle, the detection can be made without including phase noise components or frequency offset components at the base station side. That is, it is possible to reproduce stable IF signal components without being affected by fluctuation of an optical beat frequency due to the fluctuation of the light wave emitted from the light sources 2 and 3.

The detected IF signal is outputted as signal data by the amplifier 17 and the IF demodulating circuit 18.

First Embodiment

Hereinafter, the method for generating a carrier residual signal in the optical modulating unit 4 will be described with reference to the preferred embodiments.

Figure 5:
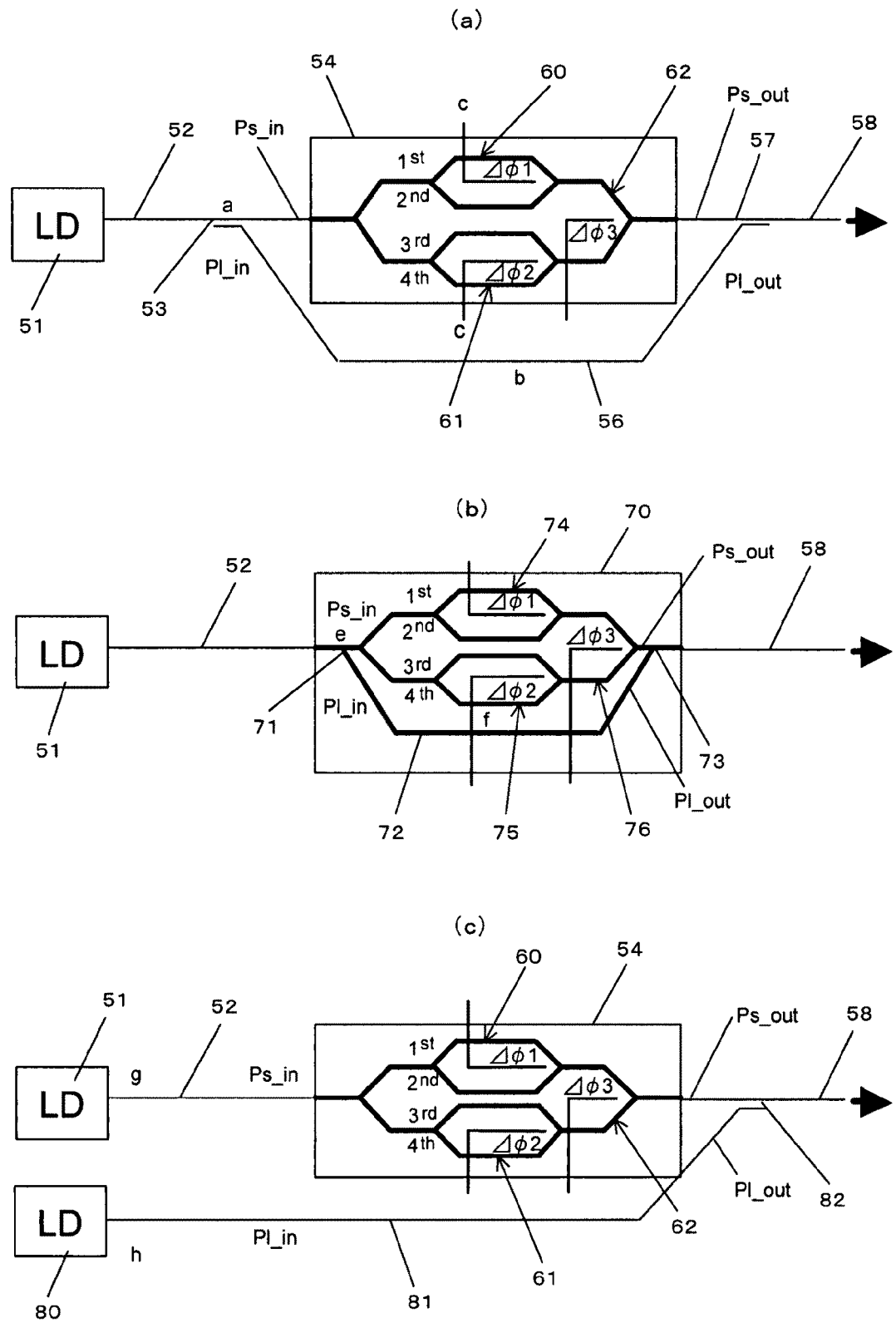
FIGS. 5A to 5C are diagrams illustrating a first embodiment of the present invention.

FIG. 5 shows an example of an SSB optical modulator that has two sub MZ optical waveguides and one main MZ optical waveguide. In particular, the SSB optical modulator shown in FIG. 5 has a structure in which a light wave entering into the SSB optical modulator and a light wave having the same frequency are multiplexed with each other at an output side of the SSB optical modulator.

In FIG. 5A, the light wave having the specific wavelength that is emitted from the laser light source 51 propagates through an optical fiber 52. Then, the light wave is branched into two light waves by an optical branching unit 53 such as an optical coupler or a Y-shaped optical waveguide, and one of the branched light waves is guided to the SSB optical modulator 54, and the other is guided to a bypass optical waveguide 56. In addition, the light wave emitted from the SSB optical modulator 54 and the light wave propagating through the bypass optical waveguide 56 are multiplexed by an optical multiplexing unit 57 such as an optical coupler or a Y-shaped optical waveguide, and the multiplexed light wave propagates through the optical fiber 58 to then be emitted to the outside.

In the SSB optical modulator 54, the two sub MZ optical waveguides 60 and 61, and one main MZ optical waveguide 62 are formed with a nesting structure. Similar to FIG. 2, the RF electrodes (two ports) that are disposed on the sub MZ optical waveguide, and direct current bias electrodes (three ports) that adjust phase variation amounts of the sub MZ optical waveguides and the main MZ optical waveguide are formed.

If the modulation signal is applied to the RF electrode, the phase modulation light in each branch optical waveguide of the sub MZ optical waveguides follows a first kind of Bessel function $J_n$(m) (n=1, 2, . . . ; m is an optical phase modulation index), and therefore, an optical power is distributed to an n-fold component of the modulation frequency.

If inputting to the RF port a signal satisfying (1+H)·φ(t) (H denotes a Hilbert function, and φ(t) denotes a modulation signal. '(1+H)·φ(t)' means that a signal of φ(t) is applied to one of the RF ports, and H[φ(t)] is applied to the other of the RF ports.), the characteristic of the output $E_{out}$ of the SSB optical modulator is represented by Equation 3.

$$E_{out}=E_{in}/2 * \exp(j\omega t) * \{\exp(jm \cos \Omega t) + \exp(jd_1) * \exp(-jm \cos \Omega t) + \exp(jd_2) * \exp(jm \sin \Omega t) + \exp(jd_3) * \exp(-jm \sin \Omega t)\} \quad (3)$$

In this case, $E_{in}$ denotes an amplitude of input light to the SSB optical modulator 54, $\omega_0$ denotes an angular frequency of the input light, Ω denotes an angular frequency of the modulation signal, m denotes an optical phase modulation index, and each of $d_1$ to $d_3$ denotes a phase variation amount of the optical waveguides given according to the applied voltage amounts, respectively.

Further, the optical phase modulation index m is defined by Equation 4.

$$m=\pi*(V/V_\pi) \quad (4)$$

Here, V denotes an amplitude value of the modulation signal RF, $V_\pi$ denotes a half-wavelength voltage for modulating a phase with respect to each branch optical waveguide of the sub MZ optical waveguide. (In this case, it is assumed that all the branch waveguides have $V_\pi$).

If adjusting m and $d_1$ to $d_3$ at the same time, a specific component of $J_n(\phi)$ generated after multiplexing in each optical waveguide is reinforced at the time of the same phase, and it is cancelled at the time of an inverse phase. Finally, the specific component can be extracted or suppressed.

In the method for generating a carrier residual signal and its device according to the embodiment of the present invention, the optical modulating unit that includes the SSB optical modulator adjusts the optical phase modulation index and the phase variation amount, extracts only the carrier components and the specific signal components, and sets the ratio of optical intensity between the carrier component and the specific signal component substantially to 1, thereby generating a carrier residual signal that satisfies the condition of the self heterodyne transmission method.

Figure 2:
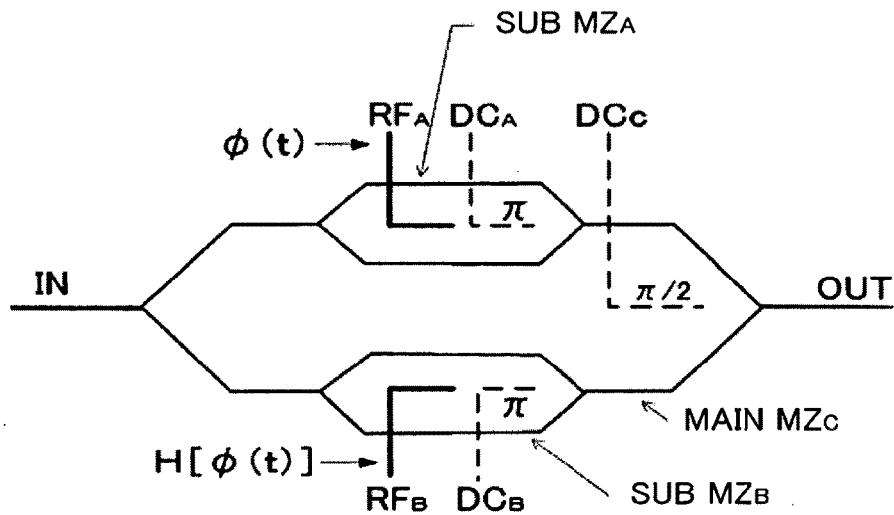
FIG. 2 is a schematic view illustrating an SSB optical modulator that includes two sub MZ optical waveguides and one main MZ optical waveguide.
Figure 3:
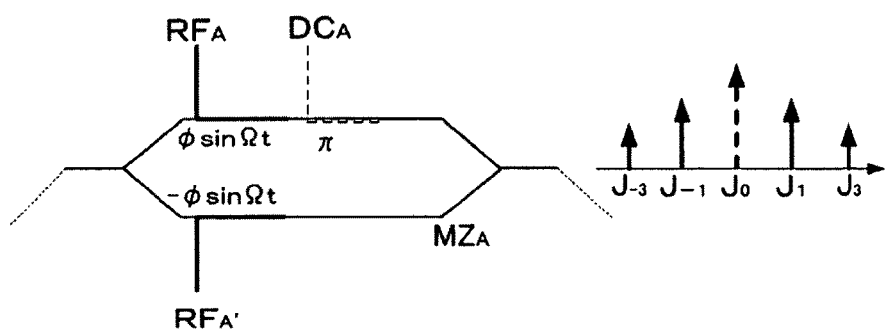
FIG. 3 is a diagram illustrating a function of the sub MZ optical waveguide of the SSB optical modulator.

In the SSB optical modulator 54 shown in FIG. 5A, $\omega_0$=60 GHZ, and Ω=1 GHZ are set, as in a SSB-SC optical modulator of FIG. 2, only a signal component ($J_1$) associated with the primary Bessel function is extracted, and the carrier component ($J_0$) and other high-order components are controlled by being suppressed. In this case, from the light emitted from the SSB optical modulator 54, as shown in FIG. 6A, a spectrum is obtained in which the frequency is shifted by 1 GHz from 60 GHz.

Figure 6:
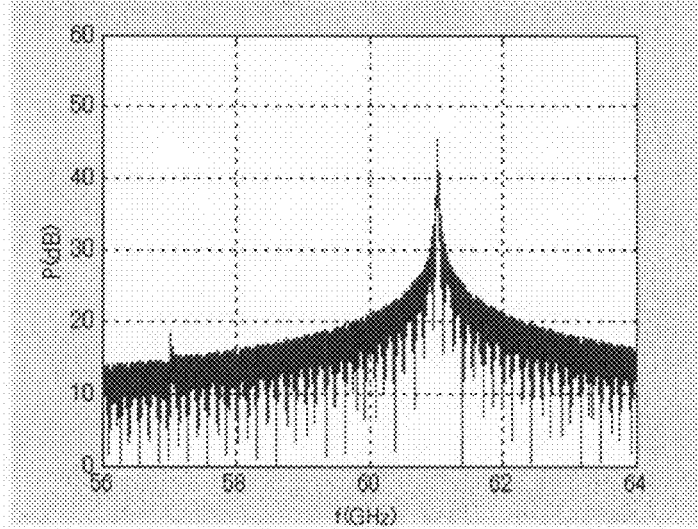
FIGS. 6A and 6B are graphs illustrating an optical spectrum distribution state in the first embodiment of the present invention.
Figure 6:
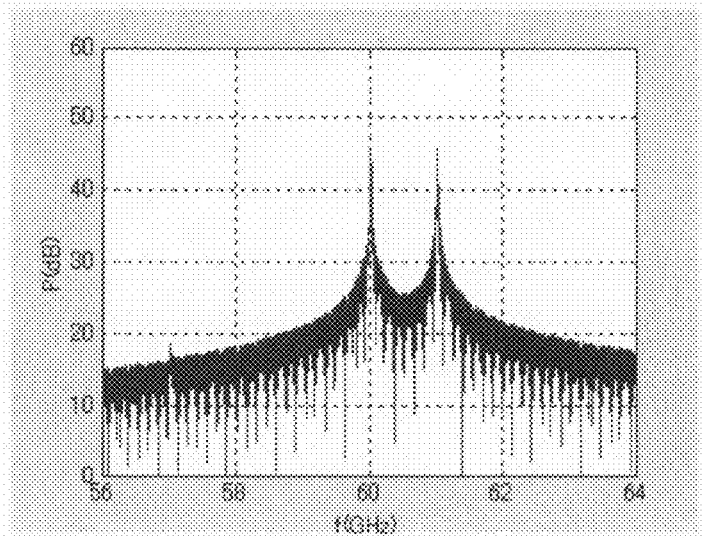

As shown in FIG. 5A, when the emitted light is multiplexed with a light wave having only the carrier components propagating through the bypass optical waveguide 56, the optical spectrum of the light wave propagating through the optical fiber 58 is formed as shown in FIG. 6B.

The ratio of the optical intensity between the carrier component and the specific signal component ($J_1$) can be obtained by adjusting the branch ratio of the light wave of the branch optical waveguide 53 or the optical intensity of the light wave in the bypass optical waveguide 56.

Further, an attenuator is disposed in the bypass optical waveguide 56, and the optical intensity of the light wave that propagates through the bypass optical waveguide 56 can be adjusted.

Further, instead of the SSB optical modulator 54, the single MZ optical modulator shown in FIG. 1 is used, and the single MZ optical modulator is adjusted such that the carrier component and the signal component associated with the primary Bessel function are outputted. The phases and the optical intensity of the carrier components emitted from the SSB optical modulator and the light wave (the same frequency as the carrier component) that propagates through the bypass optical waveguide 56 are adjusted, so that the carrier residual signal shown in FIG. 6B can be generated.

In FIG. 5A, the bypass optical waveguide 56 such as an optical fiber is provided to the outside of the SSB optical modulator 54. However, as shown in FIG. 5B, the sub MZ optical waveguides 74 and 75 and the main MZ optical waveguide 76 forming the SSB optical waveguide, and the bypass optical waveguide 72 are provided on the same substrate, thereby constructing the optical modulating unit 70.

In this case, the optical branching unit 71, and the optical multiplexing unit 73 may also be formed on the same substrate.

When adjusting the spectrum distribution of the light outputted from the optical modulator 70, similar to FIG. 5A, a method of adjusting optical phase modulation index applied to the SSB optical modulator or the phase variation amount, or a method of adjusting the branch ratio of the light wave of the optical branching unit 71 or the optical intensity of the light wave in the bypass optical waveguide 72 may be used.

Further, as shown in FIG. 5C, as a method of overlapping the light wave corresponding to the carrier component the light wave emitted from the SSB optical modulator 54, another laser light source 80 that has the same wavelength as the laser light source 51 may be provided.

The light wave that is emitted from the laser light source 80 propagates through the optical waveguide 81, and then is multiplexed with the light wave emitted from the SSB optical modulator in the optical multiplexing unit 82. In addition, the multiplexed light wave propagates through the optical fiber 58 and it is then emitted to the outside.

When adjusting the spectrum distribution of the light wave that propagates through the optical fiber 58, a method of adjusting a ratio of a power between the laser light sources 51 and 80, or a method of adjusting an optical phase modulation index applied to the SSB optical modulator or the phase variation amount, or a method of adjusting intensity of the light wave that propagates through the optical waveguide 81, or a method of adjusting a coupling ratio of light waves in the optical multiplexing unit 82 may be used.

Figure 7:
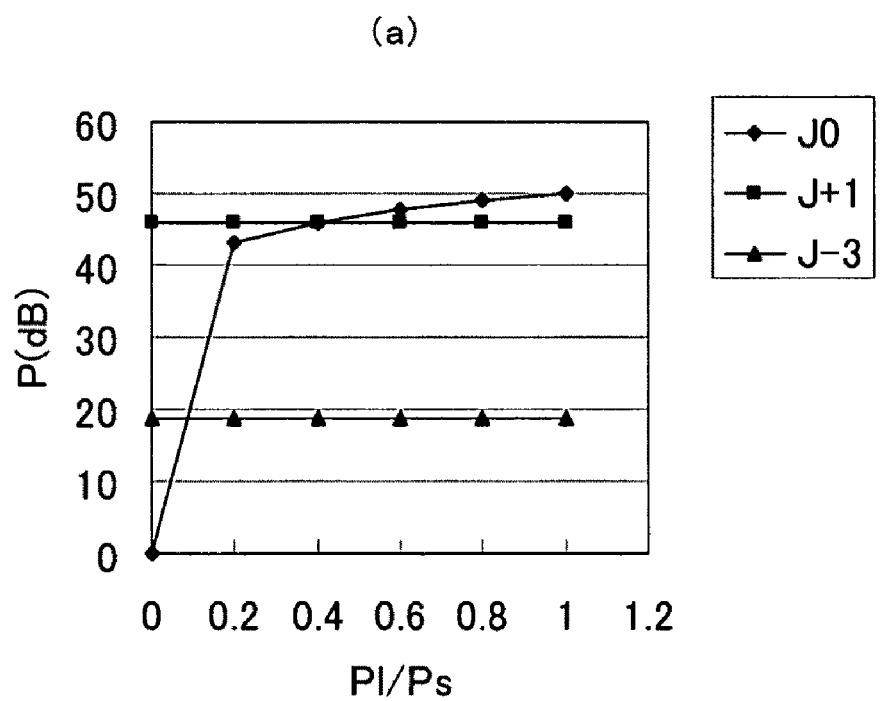
FIGS. 7A and 7B are graphs illustrating a ratio of P1 and Ps and output variation of a carrier component and a signal component associated with an optical phase modulation index m in the first embodiment of the present invention.
Figure 7:
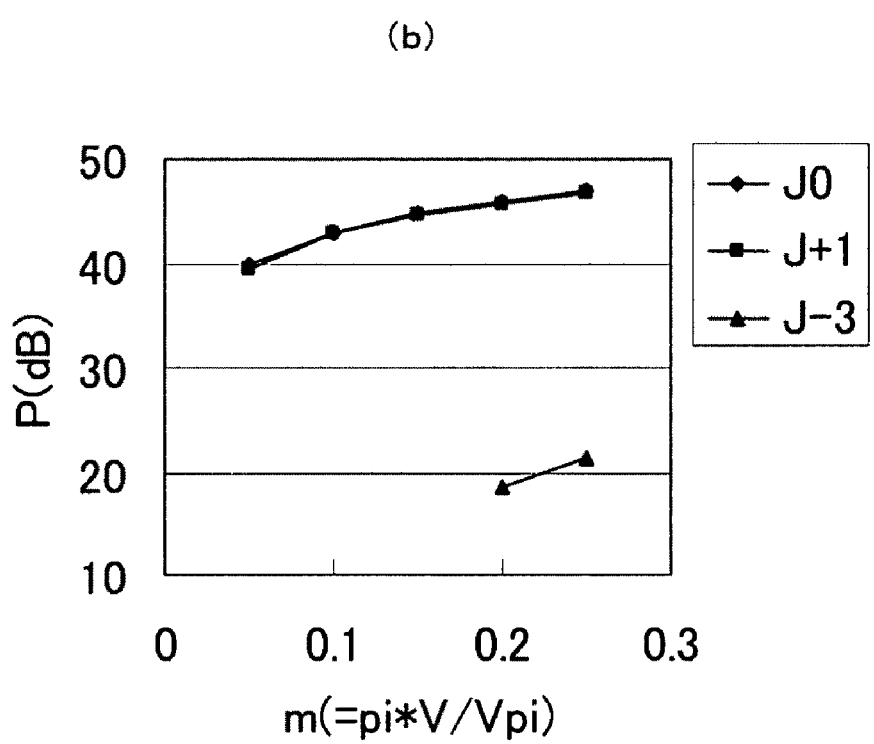

FIG. 7 is a graph illustrating the relationship among the optical intensity Ps of the incident light to the SSB optical modulator in FIG. 5A and the optical intensity P1 of the light wave that propagates through the bypass optical waveguide, and the optical intensity of the carrier component ($J_0$), the specific signal component ($J_1$), and the other high-order signal component ($J_3$) associated with the optical phase modulation index m.

In FIG. 7A, when the condition m=0.2 is constantly maintained, in the condition P1/P2≈0.4, it can be understood that the optical intensity of the carrier component ($J_0$) and the specific signal component ($J_1$) becomes substantially 1. Thereby, the optical modulating unit that is obtained by combining the bypass optical waveguide and the SSB optical modulator is an effective unit in the method for generating the carrier residual signal, and the intensity ratio of $J_0$ and $J_1$ can be easily adjusted by adjusting the ratio of P1 and Ps.

FIG. 7B shows intensity variation of each component when the optical phase modulation index m varies. In particular, in a case in which the condition m=0.2 is satisfied, P1/Ps≈0.4 and the intensity ratio between $J_0$ and $J_1$ becomes substantially 1, if m varies according to the relationship P1/Ps≈2 m, as shown in FIG. 7B, it can be understood that the intensity ratio between $J_0$ and $J_1$ varies while maintaining the relationship of substantially 1. The value of P1/Ps and the m value that satisfy the relationship by which the intensity ratio of $J_0$ and $J_1$ becomes substantially 1 are determined, and the m value and the P1 and Ps values are varied to satisfy the condition P1/Ps=k×m (k denotes a proportional constant). As a result, even when the optical phase modulation index m varies, the optical intensity between the carrier component ($J_0$) and the specific signal component ($J_1$) can be maintained to become substantially 1.

Figure 8:
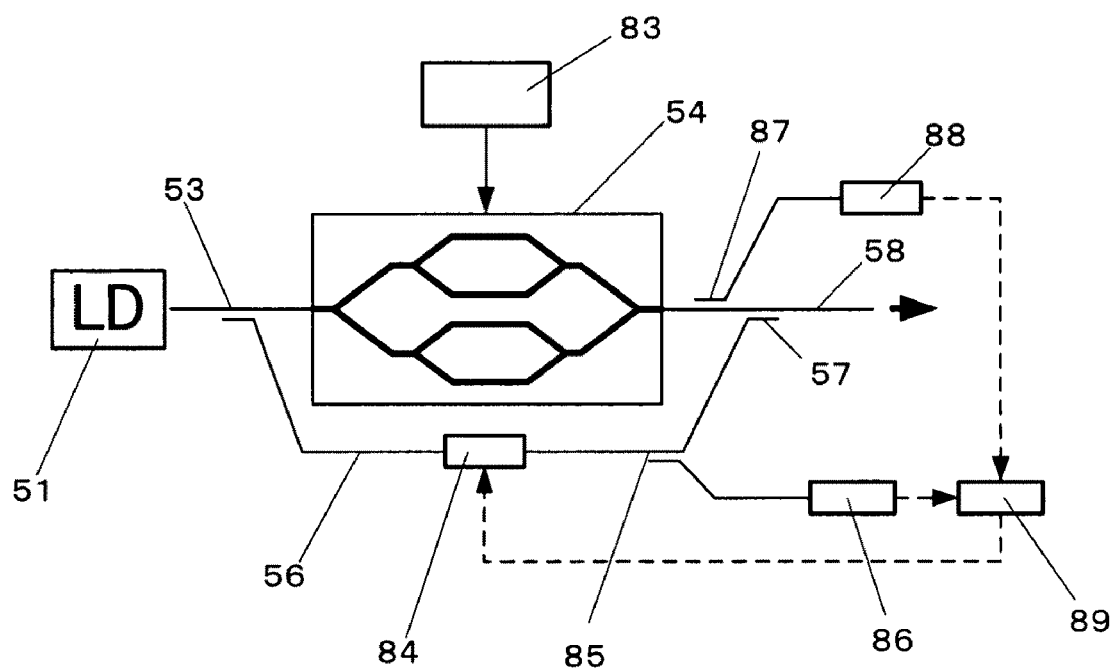
FIG. 8 is a diagram illustrating a structure for automatically adjusting a ratio of optical intensity between a carrier component and a specific signal component.

FIG. 8 is a diagram illustrating a method of automatically adjusting the ratio of optical intensity between the carrier component and the specific signal component in a case in which the bypass optical waveguide is used, as shown in FIGS. 5A and 5B.

Similar to FIG. 5A, the light wave of the specific wavelength that is emitted from the laser light source 51 propagates through the optical fiber. Then, the light wave is branched into two light waves by an optical branching unit 53 such as an optical coupler or a Y-shaped optical waveguide, and one of the branched light waves is guided to the SSB optical modulator 54, and the other is guided to the bypass optical waveguide 56. In addition, a predetermined modulation signal is inputted to the SSB optical modulator 54 by the modulation circuit 83.

In the middle of the bypass optical waveguide 56, an optical intensity adjusting unit 84, such as a VOA (Variable Optical Attenuator), which can vary and adjust a transmission amount of a light wave, is disposed.

In addition, the light wave emitted from the SSB optical modulator 54 and the light wave propagating through the bypass optical waveguide 56 are multiplexed with each other by the optical multiplexing unit 57, such as an optical couple or a Y-shaped optical waveguide, and then propagate through the optical fiber 58 to be emitted to the outside.

In a case in which only a light wave of the specific signal component is outputted from the SSB optical modulator 54 and the light wave of the carrier component is supplied by the bypass optical waveguide, as shown in FIG. 8, the optical intensity adjusting unit is controlled by optical couplers 85 and 87, and optical detectors 86 and 88.

That is, a portion of the light wave propagating through the bypass optical waveguide is guided to the optical detector 86 through the optical coupler 85, and a portion of the light wave outputted by the SSB optical modulator 54 is guided to the optical detector 88 through the optical coupler 87. The output of the optical detector 86 corresponds to the optical intensity of the carrier component, and the output of the optical detector 88 corresponds to the optical intensity of the specific signal component. The output signals of the optical detector 86 and the optical detector 88 are introduced to a comparator 89, and the transmission amount of the optical intensity adjusting unit 84 is adjusted according to the output of the comparator 89.

By adopting this structure, the ratio of the optical intensity between the carrier component and the specific signal component can be automatically adjusted.

Further, when the SSB optical modulator 54 outputs the light wave including the carrier component and the specific signal component, the optical coupler 85 is provided in the downstream side of the optical multiplexer 57 on the optical fiber 58. In addition, an optical detector that can detect only a light wave of the carrier component as the optical detector 86, and an optical detector that can detect only a light wave of a specific signal component is disposed as the optical detector 88. Therefore, it is possible to detect the optical intensity of each of the carrier component and the specific signal component.

In the same manner as the above description, the output signal of each optical detector is introduced to the comparator 89, and the optical intensity adjusting unit is controlled on the basis of the compared result.

Second Embodiment

Next, a method for generating a carrier residual signal and its device according to a second embodiment will be described.

Figure 9:
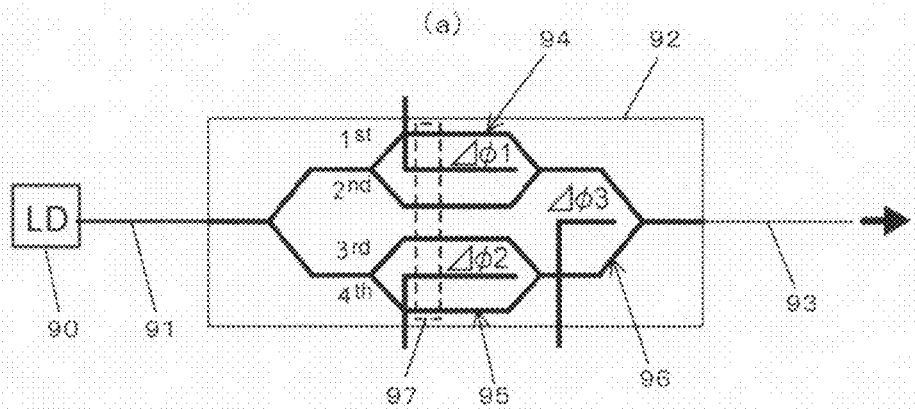
FIG. 9 is a diagram illustrating a second embodiment of the present invention.
Figure 9:
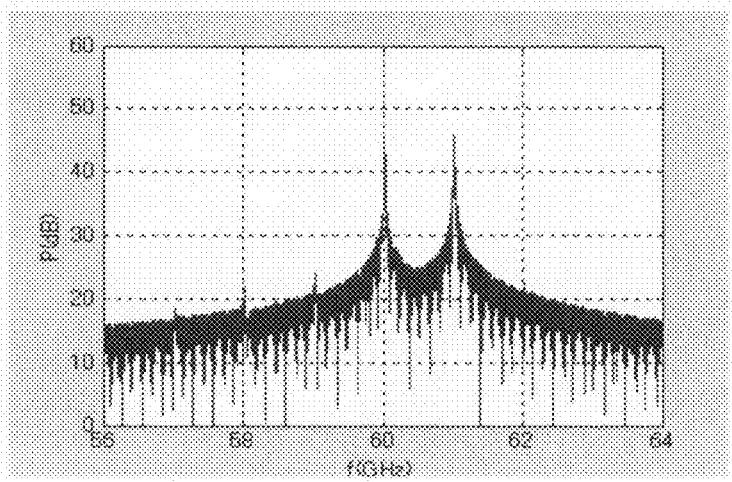
Figure 9:
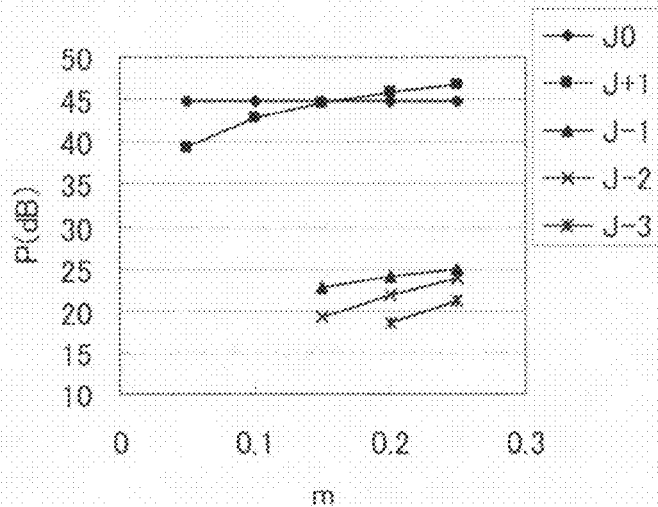

FIG. 9 shows an example where an SSB optical modulator 92 including two sub MZ optical waveguides 94 and 95 and one main MZ optical waveguide 96 is used. In particular, by forming a film 97, such as a buffer layer ($SiO_2$, $Ta_2O_5$, or the like), on the optical waveguide on the SSB optical modulator, or by trimming a portion of the film 97, the carrier component and the specific signal component are extracted, and the ratio of the optical intensity between the carrier component and the specific signal component is adjusted.

When it is difficult to optimally adjust the direct current bias of the SSB optical modulator, the optical modulating unit can achieve the optimal set value by properly performing the trimming of the portion formed on the optical waveguide while monitoring the characteristic of the SSB optical modulator.

FIGS. 9B and 9C show the result in a case in which each phase state associated with the sub MZ optical waveguide is adjusted by trimming the film 97 such that the optical intensity of the carrier component ($J_0$) and the specific signal component ($J_1$) becomes substantially 1.

The voltages of the direct bias electrodes that are applied to the respective optical waveguides are set such that on the basis of the first arm of the sub MZ optical waveguide 94 ($1^{st}$ of FIG. 9A), the phase difference of the second arm ($2^{nd}$) of the sub MZ optical waveguide 94 becomes $\pi$, the phase difference of the third arm ($3^{rd}$) of the sub MZ optical waveguide 95 becomes $1.1\pi$, and the phase difference of the fourth arm ($4^{th}$) of the sub MZ optical waveguide 95 becomes $2.9\pi$.

In the optical phase modulation index m=0.15, the film 97 of the sub MZ optical waveguides 94 and 95 are trimmed such that the ratio of the carrier component ($J_0$), and the specific signal ($J_1$) becomes substantially 1, and then the optical phase modulation index m is varied. FIG. 9C shows the variation of the carrier component ($J_0$) and the high-order signal component with respect to the variation of m.

Referring to the graphs illustrated in FIGS. 9B and 9C, it can be understood that even when the spectrum of the light outputted from the SSB optical modulator is adjusted, by forming the film on each optical waveguide in the SSB optical modulator or trimming the film, the carrier component and the specific signal component are extracted, and the ratio of the optical intensity is adjusted.

Third Embodiment

Next, a method for generating a carrier residual signal and a device according to a third embodiment of the invention will be described.

Figure 10:
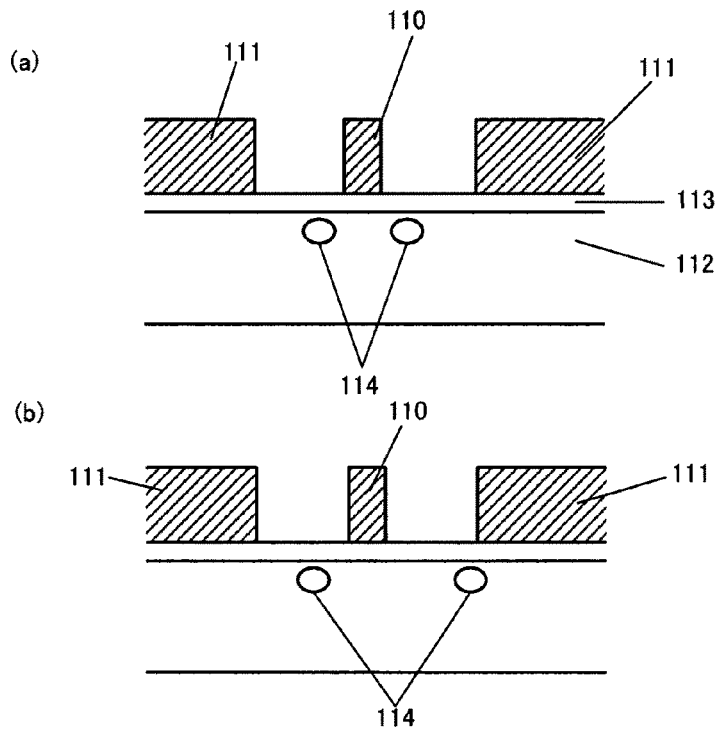
FIG. 10A is a diagram illustrating a case in which an arrangement relationship between a modulation electrode and an optical waveguide is symmetrical.
FIG. 10B is a diagram illustrating a case in which an arrangement relationship between a modulation electrode and an optical waveguide is asymmetrical.

FIG. 10 is a diagram illustrating the relationship among the optical waveguide 114 in the SSB optical modulator, and a signal electrode 110 and ground electrodes 111 which are modulation electrodes. When the arrangement relationship between the modulation electrode and the optical waveguide is symmetrical as shown in FIG. 10A, and when the arrangement relationship between the modulation electrode and the optical waveguide is asymmetrical as shown in FIG. 10B, since the electric field intensity applied to the optical waveguide varies, it is possible to vary the optical phase modulation index m or the phase difference among the light waves propagating through the respective optical waveguides. As a result, it is possible to adjust the optical spectrum emitted from the SSB optical modulator.

Further, reference numeral 112 denotes a substrate that has an electrooptic effect, and reference numeral 113 denotes a buffer layer.

Figure 11:
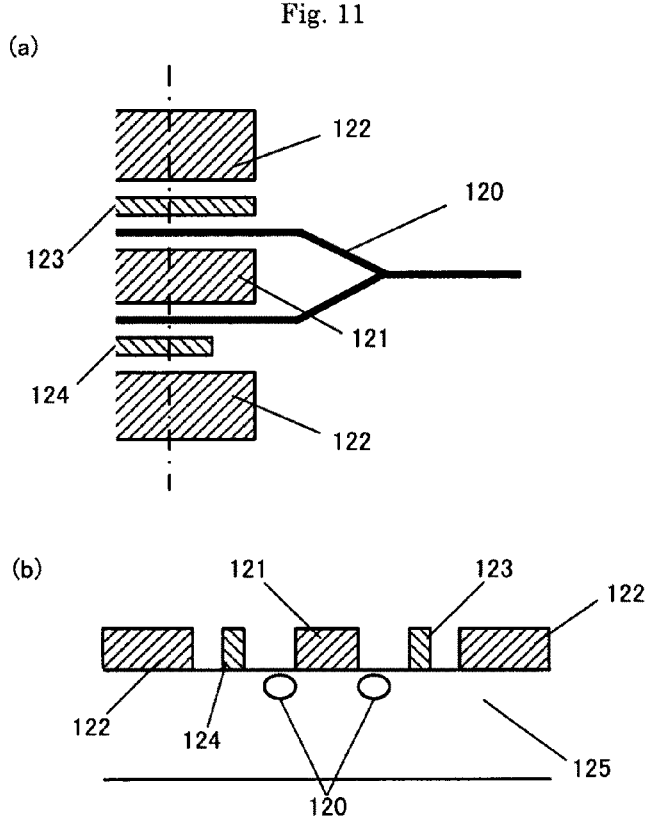
FIGS. 11A and 11B are diagrams illustrating an arrangement state in the vicinity of an optical waveguide, when an adjusting electrode is used.

Further, as shown in FIG. 11, the adjusting electrodes 123 and 124 for adjusting an electric field applied to the branch waveguides 120 can be formed between the signal electrode 121 and the ground electrodes 122 constituting the modulation electrode. It is possible to adjust the phase of the light wave propagating through the branch waveguides by the adjusting electrode.

For example, when the modulation signals or the direct current biasing signals provided in each Mach-Zehnder type optical waveguide are interlocked with each other, and it is difficult to minutely adjust each of the signals, a phase of each optical waveguide can be adjusted by the adjusting electrode.

Further, as for the shape or arrangement of the adjusting electrodes 123 and 124, different setting is made for each optical waveguide, so that each optical waveguide can be suitably controlled.

Next, when the method for generating a carrier residual signal and the device according to the embodiment of the present invention are applied to the optical fiber radio communication system, a method of evaluating characteristics will be described.

Figure 12:
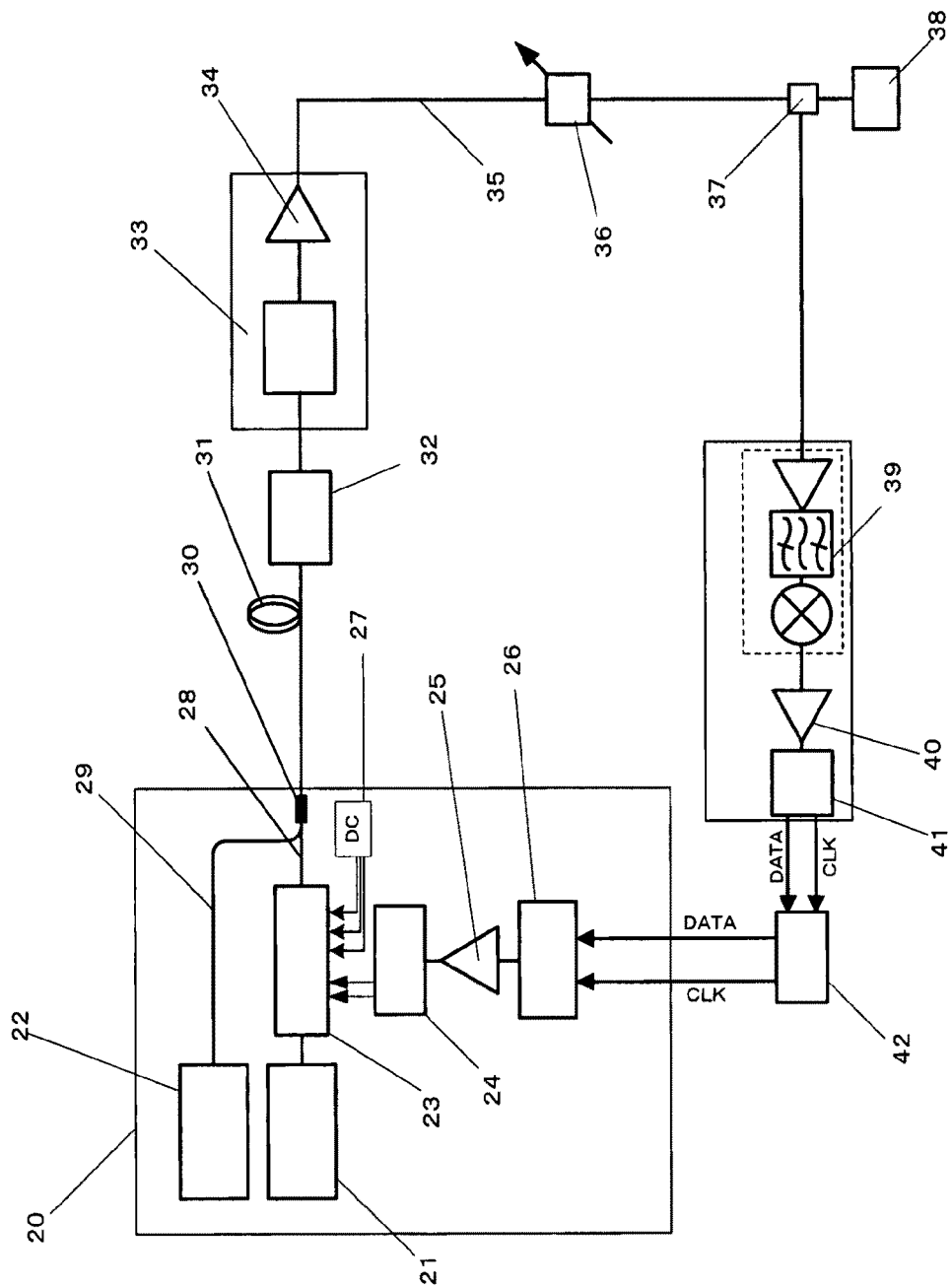
FIG. 12 is a schematic view illustrating a method of evaluating characteristics of an optical fiber radio communication system that uses a device for generating a carrier residual signal according to an embodiment of the invention.

FIG. 12 shows an experimental configuration example of the transmission test that uses a QPSK (Quadrature PhaseShift Keying) signal.

The optical modulating unit 23 uses the optical modulator shown in FIG. 5A.

In the light sources 21 and 22 that constitute a base station 20, two light sources in which a wavelength is variable with a 1.5 μm band are used. The light sources 21 and 22 are independently mode-locked by GP-IB (General Purpose Interface Bass) control while confirming previously the wavelength difference (about 0.48 nm), such that a carrier of 60 GHz band is obtained by an optical spectrum analyzer. The wavelength stability after the mode locking is $5 \times 10^{-8}$, and the line width is 1 MHz.

The pseudo random pulse pattern (PRBS: $2^7-1$) outputted from the error analyzer 42 at the communication speed 155.52 Mbps is subjected to the QPSK modulation (central frequency 700 MHz) by the QPSK transmitter 26, and then inputted to a 90 degree hybrid 24 through the amplifier 25. In this case, the modulation signal is branched into an original signal and the signal subjected to Hilbert conversion, and then inputted to each RF port of the SSB optical modulator that is embedded in the optical modulating unit 23.

In addition, in the SSB optical modulator that has two sub MZ optical waveguides and the main MZ optical waveguide, by adjusting the direct current bias voltage 27 at three locations, an optical signal is generated in which signal components (the 'signal component' is also called 'an image component') excluding the specific signal component associated with the specific high-order Bessel function is suppressed. In this experiment, in particular, since the signal component associated with the primary Bessel function remains, the bias is adjusted such that the component of the lower wave band and the unnecessary high-order component are suppressed.

The light wave that is emitted from the optical modulating unit 23 propagates through the optical fiber 28, and then it is emitted from the light source 22 and then multiplexed with the light wave propagating through the optical fiber 29 by a 3 dB coupler 30. The multiplexed optical carrier component and signal components propagate through a single mode fiber (SMF) 31 (fiber length: 2 m, 5 km, and 10 km).

In the optical/electrical conversion unit, a uni-traveling-carrier photodiode (UTC-PD) 33 of a response band 50 GHz is used. Further, a variable optical attenuator 32 for adjusting an input power is inserted in the previous stage.

The transmission circuit and the reception circuit are connected by the waveguide 35. The output of the photodiode 33 is amplified by the amplifier 34, and then propagates through the waveguide 35. The variable RF attenuator 36 is inserted in the middle of the waveguide 35, and an input RF power to the reception circuit is adjusted while monitoring it by using a power meter 38. Reference numeral 37 denotes a branch waveguide that branches a portion of a millimeter wave propagating through the waveguide 35 in the power meter 38.

In the reception circuit side, the square detection circuit 39 is a small-sized MMIC (Microwave Monolithic IC) module that is manufactured on the basis of GaAs. The square detection circuit 39 includes an amplifier, a bandpass filter, and a square detector provided therein. The obtained reproducing signal passes through the amplifier 40, and then it is demodulated by the QPSK demodulator 41. Then, the reproducing signal is synchronously detected by an error analyzer 42, and the transmission and reception signals are compared with each other and the bit error rate characteristic is obtained. In this experiment, an error correction process is not performed.

The characteristics of the optical fiber radio communication system that uses the device for generating the carrier residual signal according to the embodiment of the present invention are tested as described above, and the following result is obtained.

(1) Generation of RF Signal and Detection Spectrum

The carrier frequency of the generated spectrum is 59.53 GHz, and the IF signal is a non-modulated signal having a central frequency of 700 MHz.

When the optical phase modulation index m is low, the condition $J_1/J_0 \approx 1$ cannot be satisfied although the image component is sufficiently suppressed. However, if the optical phase modulation index is set to about m=0.6 by increasing it, the image suppressing ratio (the difference between $J_1/J_0$ and $J_2/J_0$) can ensure about 30 dB, and the spectrum that satisfies the condition $J_1/J_0 \approx 1$ is generated.

Further, if the optical phase modulation index is set to exceed about 0.6, unnecessary low wave band $J_{-1}$ or high-order components $J_2$ and $J_3$ are generated, and it may become $J_{+1}/J_0 \neq 1$.

In a case in which the optical phase modulation index is set to about 0.6, even when the RF filter is used in an antenna station, it is confirmed that it is possible to achieve spurious −10 dB or less that is a technology reference of a 60 GHz band.

Further, it is confirmed that the frequency of the generated millimeter wave becomes unstable due to the frequency offset by the optical beat frequency, and the maximum value of the offset amount becomes 20 MHz (quality: 334 ppm). However, it is confirmed that when the transmitted radio signal is reproduced, the stability of the reproducing signal is high, and it is not affected by the fluctuation of the optical beat frequency as an advantage of the self heterodyne transmission method.

Therefore, it is confirmed that when the device for generating a carrier residual signal of the present invention is applied to the method for generating an optical millimeter wave beat signal, the stable signal to be used in the communication system can be reproduced. However, the frequency offset amount of the generated millimeter wave needs to be within a radio quality reference (500 ppm or less) of a 60 GHz band, and in the used optical light source, the wavelength stability with respect to the oscillation wavelength is $8 \times 10^{-8}$ or less.

(2) Signal Transmission Characteristic

In the optical phase modulation index of the SSB optical modulator, the condition $m=0.19\pi$ is set, the input power to UTC-PD is set to −2.6 dBm, and the optical fiber length is set as the three lengths, such as 2 m, 5 km, and 10 km.

When the received RF power is −60 dB or less, a CN (carrier to noise) rate property that does not depend on the fiber length is obtained, and when the received RF power is −60 dB or more, a non-linear CN rate property is shown. It is assumed that an upper limit level of the input of the detector is close.

Further, when an antenna transmitting power of 10 mW, a signal band of 100 MHz, an antenna gain of 6 dBi (transmission and reception), and the space distance of 5 m are used as line design values, the calculated reception RF power becomes −60 dBm. From the same experimental result, the obtained CN ratio is 20 dB.

An error rate characteristic of a QPSK/155.52 Mbps signal (central frequency of 700 MHz) to the reception RF power is evaluated. The setting of the experimental system (an optical phase modulation index, a PD input power, and a fiber length) is based on the same conditions as the CN ratio measurement.

It can be understood from the experimental result that the bit error ratio does not depend on the fiber length over the received RF power of −62 to −72 dBm, and the error is not generated in −60 dBm or less.

Similar to the above-description, when an antenna transmitting power of 10 mW and an antenna gain of 6 dBi (transmission and reception) are used as the line setting values, the bit error rate is zero at the space distance of 5 m, and becomes $10^{-4}$ at the space distance of 12 m.

Further, when the 8 PSK signal (central frequency of 700 MHz) is transmitted through the fiber over 10 km, if the obtained reception I-Q constellation is investigated, even though the signal is transmitted through the fiber over 10 km, excellent constellation that is superior to an original signal is obtained. Further, as the transmission example of the wide band modulation signal, the transmission of the BS broadcasting signal (8 PSK, multicarrier) is tested. When the signal is transmitted through the fiber over 10 km and the radio communication is performed in a remote station, it is confirmed that the BS broadcasting signal can be received by the terminal.

From the obtained result, even in the wideband digital modulation signal, in the optical fiber radio communication system that uses the device for generating the carrier residual signal, the signal can be transmitted over 10 km.

The present invention is not limited to the above description, but various modification and changes can be made without departing from the spirit and scope of the invention.

As described above, according to the embodiments of the invention, it is possible to provide the method for generating a carrier residual signal and the device thereof, in which a heterodyne optical signal used in a photometric field or an optical fiber radio communication field can be stably generated with a simplified structure.

What is claimed is:

1. A method for generating a carrier residual signal, comprising the steps of:
    causing a light wave having a specific wavelength to enter into an optical modulating unit comprising an SSB optical modulator formed on a substrate and a bypass optical waveguide that is me same substrate and that connects an input part of the SSB optical modulator to an output part of the SSB optical modulator;
    providing carrier component related to a zero-order Bessel function in the bypass optical waveguide;
    providing a specific signal component related to a specific high-order Bessel function while suppressing signal components other than the specific signal component related to the specific high-order Bessel function in the SSB optical modulator:
    causing to be included in a light wave emitted from the optical modulating unit the carrier component and the specific signal component; and
    setting a ratio of optical intensity between the carrier component and the specific signal component substantially to 1.

2. The method for generating a carrier residual signal according to claim 1,
    wherein the SSB optical modulator comprises two sub-Mach-Zehnder type optical waveguides nested into branch waveguides of a main Mach-Zehnder type optical waveguide.

3. The method for generating a carrier residual signal according to claim 2, further comprising the step of:
    adjusting an optical modulation phase or intensity in the two sub-Mach-Zehnder type optical waveguides or the main Mach-Zehnder type optical waveguide.

4. A device for generating a carrier residual signal comprising:
    an optical modulating unit that comprises a light source generating a light wave having a specific wavelength, and an optical modulating unit comprising an SSB optical modulator formed on a substrate, wherein
    the optical modulating unit comprises a bypass optical waveguide that is formed on the same substrate as the SSB optical modulator, and that connects an input part of the SSB optical modulator to an output part of the SSB optical modulator,
    a light wave emitted from the light source enters into the optical modulating unit,
    the bypass optical waveguide provides a carrier component related to a zero-order Bessel function,
    the SSB optical modulator provides a specific signal component related to a specific high-order Bessel function while suppressing signal components other than the specific signal component related to the specific high-order Bessel function,
    a light wave emitted from the optical modulating unit comprises the carrier component and the specific signal component, and
    a ratio of optical intensity between the carrier component and the specific signal component is set substantially to 1.

5. The device for generating a carrier residual signal according to claim 4,
    wherein the SSB optical modulator comprises two sub-Mach-Zehnder type optical waveguides nested into branch waveguides of a main Mach-Zehnder type optical waveguide.

6. The device for generating a carrier residual signal according to claim 5,
    further comprising a film formed on the two sub-Mach-Zehnder type optical waveguides or the main Mach-Zehnder type optical waveguide.

7. The device for generating a carrier residual signal according to claim 5,
    wherein the two sub-Mach-Zehnder type optical waveguides or the main Mach-Zehnder type optical waveguide comprise a portion having a structure in which two branch waveguides in each Mach-Zehnder type optical waveguide are arranged asymmetrically to electrodes for applying a modulation electric field or a direct current bias electric field to the branch waveguides.

8. The device for generating a carrier residual signal according to claim 5,
    wherein the two sub-Mach-Zehnder type optical waveguides or the main Mach-Zehnder type optical waveguide comprise
        electrodes for applying a modulation electric field or a direct current bias electric field to two branch waveguides in each Mach-Zehnder type optical waveguide, and
        adjusting electrodes for adjusting the electric field applied to the branch waveguides.

9. The device for generating a carrier residual signal according to claim 4,
    wherein an optical intensity adjusting unit, which adjusts intensity of a light wave propagating through the bypass optical waveguide, is disposed in a middle of the bypass optical waveguide.

10. The device for generating a carrier residual signal according to claim 6, wherein a portion of the film on the two sub-Mach-Zehnder type optical waveguides or the main Mach-Zehnder type optical waveguide is removed.

* * * * *